US009621587B2

(12) United States Patent
Roberts et al.

(10) Patent No.: US 9,621,587 B2
(45) Date of Patent: *Apr. 11, 2017

(54) METHOD OF CUSTOMIZING A STANDARDIZED IT POLICY

(71) Applicant: BlackBerry Limited, Waterloo (CA)

(72) Inventors: Phillip Roberts, Waterloo (CA); Ronald J.J. Hanson, Mount Forest (CA); Rudy Eugene Rawlins, Scarborough (CA)

(73) Assignee: BlackBerry Limited, Waterloo (CA)

( * ) Notice: Subject to any disclaimer, the term of this patent is extended or adjusted under 35 U.S.C. 154(b) by 217 days.

This patent is subject to a terminal disclaimer.

(21) Appl. No.: 14/228,473

(22) Filed: Mar. 28, 2014

(65) Prior Publication Data

US 2014/0215554 A1 Jul. 31, 2014

Related U.S. Application Data

(63) Continuation of application No. 13/612,048, filed on Sep. 12, 2012, now Pat. No. 8,689,284, which is a
(Continued)

(51) Int. Cl.
*H04L 29/06* (2006.01)
*G06F 21/31* (2013.01)
(Continued)

(52) U.S. Cl.
CPC .............. *H04L 63/20* (2013.01); *G06F 21/31* (2013.01); *H04L 41/0893* (2013.01);
(Continued)

(58) Field of Classification Search
CPC ..... H04L 63/20; H04L 63/102; H04L 63/104; H04L 41/0893; G06F 21/31
See application file for complete search history.

(56) References Cited

U.S. PATENT DOCUMENTS 5,261,102 A 11/1993 Hoffman
5,560,008 A 9/1996 Johnson et al.
(Continued)

FOREIGN PATENT DOCUMENTS

CA 2567715 5/2007
CA 2579541 8/2007
(Continued)

OTHER PUBLICATIONS

Prosecution Documents for U.S. Appl. No. 11/362,481, issued to U.S. Pat. No. 8,332,906 on Dec. 11, 2012.
(Continued)

*Primary Examiner* — Brandon Hoffman
*Assistant Examiner* — Thong Truong
(74) *Attorney, Agent, or Firm* — Integral IP; Miriam Paton; Amy Scouten

(57) ABSTRACT

A system and method are described herein for standardizing an IT policy that is used to configure devices operating on a network. An IT policy can be generated that applies to a group of users or to one or more special users without having to define and store a new IT policy for each special user. This can be achieved by specifying global and per-user IT policy rules and merging these rules as needed to produce IT policy data.

18 Claims, 6 Drawing Sheets

Related U.S. Application Data continuation of application No. 11/362,481, filed on Feb. 27, 2006, now Pat. No. 8,332,906.

(51) Int. Cl.
   *H04L 12/24* (2006.01)
   *H04W 8/24* (2009.01)

(52) U.S. Cl.
   CPC .......... *H04L 63/102* (2013.01); *H04L 63/104* (2013.01); *H04W 8/245* (2013.01)

(56) References Cited

U.S. PATENT DOCUMENTS

| | | | |
|---|---|---|---|
| 5,619,710 A | 4/1997 | Travis, Jr. et al. | |
| 5,778,348 A | 7/1998 | Manduley et al. | |
| 5,875,327 A * | 2/1999 | Brandt ................ | G06F 9/44505 |
| | | | 713/1 |
| 5,944,821 A | 8/1999 | Angelo | |
| 5,977,821 A | 11/1999 | Shibata | |
| 6,061,794 A | 5/2000 | Angelo et al. | |
| 6,065,054 A | 5/2000 | Dutcher et al. | |
| 6,092,202 A | 7/2000 | Veil et al. | |
| 6,101,607 A | 8/2000 | Bachand et al. | |
| 6,134,593 A | 10/2000 | Alexander et al. | |
| 6,134,659 A | 10/2000 | Sprong et al. | |
| 6,141,754 A | 10/2000 | Choy | |
| 6,167,445 A | 12/2000 | Gai et al. | |
| 6,167,521 A | 12/2000 | Smith et al. | |
| 6,192,476 B1 | 2/2001 | Gong | |
| 6,202,207 B1 | 3/2001 | Donohue | |
| 6,212,635 B1 | 4/2001 | Reardon | |
| 6,216,116 B1 | 4/2001 | Barkan et al. | |
| 6,219,694 B1 | 4/2001 | Lazaridis et al. | |
| 6,233,608 B1 | 5/2001 | Laursen et al. | |
| 6,480,961 B2 | 11/2002 | Rajasekharan et al. | |
| 6,487,665 B1 | 11/2002 | Andrews et al. | |
| 6,513,121 B1 | 1/2003 | Serkowski | |
| 6,922,782 B1 | 7/2005 | Spyker et al. | |
| 6,931,379 B1 | 8/2005 | Sato et al. | |
| 6,941,355 B1 | 9/2005 | Donaghey et al. | |
| 7,546,956 B2 | 6/2009 | Adams et al. | |
| 7,792,526 B2 | 9/2010 | Salomone | |
| 7,793,355 B2 | 9/2010 | Little et al. | |
| 7,815,100 B2 | 10/2010 | Adams et al. | |
| 7,840,150 B2 | 11/2010 | Mori et al. | |
| 7,882,193 B1 | 2/2011 | Aronson et al. | |
| 8,045,958 B2 | 10/2011 | Kahandaliyanage | |
| 8,229,425 B2 | 7/2012 | Salomone | |
| 8,254,884 B2 | 8/2012 | Kahandaliyanage | |
| 8,332,906 B2 | 12/2012 | Roberts et al. | |
| 8,544,057 B2 | 9/2013 | Bocking et al. | |
| 8,689,284 B2 | 4/2014 | Roberts et al. | |
| 8,699,999 B2 | 4/2014 | Kahandaliyanage | |
| 2001/0002485 A1 | 5/2001 | Bisbee et al. | |
| 2001/0007133 A1 | 7/2001 | Moriconi et al. | |
| 2001/0032188 A1 | 10/2001 | Miyabe et al. | |
| 2002/0007454 A1 | 1/2002 | Tarpenning et al. | |
| 2002/0099837 A1 | 7/2002 | Oe et al. | |
| 2002/0120600 A1 | 8/2002 | Schiavone et al. | |
| 2002/0152376 A1 | 10/2002 | Eigeles | |
| 2002/0183056 A1 | 12/2002 | Lundblade et al. | |
| 2003/0023774 A1 | 1/2003 | Gladstone et al. | |
| 2003/0065724 A1 | 4/2003 | Clark | |
| 2003/0081621 A1 | 5/2003 | Godfrey et al. | |
| 2003/0114106 A1 | 6/2003 | Miyatsu et al. | |
| 2003/0135555 A1 | 7/2003 | Birrel et al. | |
| 2003/0172034 A1 | 9/2003 | Schneck et al. | |
| 2003/0191719 A1 | 10/2003 | Ginter et al. | |
| 2003/0233577 A1 | 12/2003 | Bellino | |
| 2004/0039911 A1 | 2/2004 | Oka et al. | |
| 2004/0078565 A1 | 4/2004 | Hofmeister et al. | |
| 2004/0123153 A1 * | 6/2004 | Wright et al. ................ | 713/201 |
| 2004/0177270 A1 | 9/2004 | Little et al. | |
| 2004/0255169 A1 | 12/2004 | Little et al. | |
| 2004/0260760 A1 | 12/2004 | Curnyn | |
| 2005/0050319 A1 | 3/2005 | Suraski | |
| 2005/0129042 A1 | 6/2005 | Muhonen et al. | |
| 2005/0159123 A1 | 7/2005 | Lu | |
| 2005/0190083 A1 | 9/2005 | Tyneski et al. | |
| 2005/0198179 A1 | 9/2005 | Savilampi | |
| 2005/0252963 A1 | 11/2005 | Adams et al. | |
| 2005/0256957 A1 | 11/2005 | Shay | |
| 2005/0257209 A1 | 11/2005 | Adams et al. | |
| 2005/0257268 A1 | 11/2005 | Guo et al. | |
| 2005/0278419 A1 * | 12/2005 | Morris ........................ | 709/203 |
| 2006/0112416 A1 | 5/2006 | Ohta et al. | |
| 2006/0168046 A1 | 7/2006 | Qureshi | |
| 2006/0272028 A1 | 11/2006 | Maes | |
| 2006/0282896 A1 | 12/2006 | Qi | |
| 2006/0288407 A1 | 12/2006 | Naslund et al. | |
| 2007/0118558 A1 | 5/2007 | Kahandaliyanage | |
| 2007/0204324 A1 | 8/2007 | Roberts et al. | |
| 2007/0204326 A1 | 8/2007 | Bocking et al. | |
| 2007/0294744 A1 | 12/2007 | Alessio et al. | |
| 2008/0065648 A1 | 3/2008 | Gupta et al. | |
| 2008/0162949 A1 | 7/2008 | Sato et al. | |
| 2009/0224036 A1 | 9/2009 | Adams et al. | |
| 2010/0058464 A1 | 3/2010 | Harker et al. | |
| 2011/0010705 A1 | 1/2011 | Adams et al. | |
| 2011/0289554 A1 | 11/2011 | Kahandaliyanage | |
| 2012/0297443 A1 | 11/2012 | Kahandaliyanage | |
| 2013/0007247 A1 | 1/2013 | Roberts et al. | |
| 2013/0019318 A1 | 1/2013 | Adams et al. | |

FOREIGN PATENT DOCUMENTS

| | | |
|---|---|---|
| CA | 2619196 | 8/2008 |
| CA | 2579541 | 8/2013 |
| EP | 0384610 | 2/1992 |
| EP | 0813132 | 12/1997 |
| EP | 0828209 | 3/1998 |
| EP | 1168141 | 1/2002 |
| EP | 1185923 | 3/2004 |
| EP | 1427166 | 6/2004 |
| EP | 1465041 | 10/2004 |
| EP | 1788505 | 5/2007 |
| EP | 1826944 | 5/2009 |
| FR | 2825565 | 12/2002 |
| GB | 2312767 | 5/1997 |
| GB | 2333865 | 4/1999 |
| GB | 2355819 | 5/2001 |
| GB | 2378780 | 2/2003 |
| JP | 2002056360 | 2/2002 |
| JP | 2002091598 | 3/2002 |
| JP | 2002170063 | 6/2002 |
| JP | 2002182963 | 6/2002 |
| WO | 9844404 | 10/1998 |
| WO | 9945454 | 9/1999 |
| WO | 0056027 | 9/2000 |
| WO | 0060434 | 10/2000 |
| WO | 0171590 | 9/2001 |
| WO | 0177811 | 10/2001 |
| WO | 0178395 | 10/2001 |
| WO | 02097620 | 12/2002 |
| WO | 03058411 | 7/2003 |
| WO | 03063524 | 7/2003 |
| WO | 2005106678 | 11/2005 |

OTHER PUBLICATIONS

Prosecution Documents for U.S. Appl. No. 11/679,470, issued to U.S. Pat. No. 8,544,057 on Sep. 24, 2013.
Prosecution Documents for U.S. Appl. No. 11/282,564, issued to U.S. Pat. No. 8,045,958 on Oct. 25, 2011.
Prosecution Documents for U.S. Appl. No. 13/196,925, issued to U.S. Pat. No. 8,254,884 on Aug 28, 2012.
Prosecution Documents for U.S. Appl. No. 13/561,374, issue fee paid on Jan. 9, 2014.
Prosecution Documents for U.S. Appl. No. 11/118,844, issued to U.S. Pat. No. 7,815,100 on Oct. 19, 2010.
Prosecution Documents for U.S. Appl. No. 11/118,748, issued to U.S. Pat. No. 7,546,956 on Jun. 16, 2009.

(56) References Cited

OTHER PUBLICATIONS

Document relating to CA Application No. 2,579,541, dated Jul. 31, 2012 (Office Action Response).
Document relating to CA Application No. 2,567,715, dated Aug. 31, 2009 (Office Action).
Document relating to CA Application No. 2,567,715, dated Dec. 16, 2010 (Office Action).
Document relating to CA Application No. 2,619,196, dated Mar. 3, 2011 (Notice of Allowance).
BOS, "Re: CSS: Extended tiling. Proposal", [online] May 5, 2004, pp. 1-2, XP002462798, www-style©w3.org, http://lists.w3.org/Archives/Public/www-style/2004May/0020.html.
W3C, "CSS3 Border Module" [online] Nov. 7, 2002, pp. 1-14, XP002462799, www.w3.orgITR/2002IWD-css3-border-200211071.
W3C, "CSS3 Backgrounds and Borders Module" [online] Feb. 16, 2005, pp. 1-29, XP002462800, www.w3.org/TR/2005/WD-css3-background-200502161.
Document relating to EP Application No. 05111046.8, dated Apr. 10, 2008 (Summons to Oral Proceedings).
Document relating to EP Application No. 05111046.8, dated Dec. 16, 2008 (European Decision).
Document relating to U.S. Appl. No. 12/468,441, dated Mar. 22, 2010 (Office Action).
Document relating to U.S. Appl. No. 12/468,441, dated Jun. 22, 2010 (Office Action Response).
Document relating to U.S. Appl. No. 12/468,441, dated Aug. 11, 2010 (Notice of Allowance).
Takaragi; Angou Houshiki to Ouyou [Encryption System and Application]; Journal of Information Processing; vol. 32, No. 6; Japan Information Processing Society of Japan; Jun. 1991; pp. 714-723.
Document relating to CA Application No. 2,619,196, dated Mar. 30, 2010 (Office Action).
Document relating to CA Application No. 2,619,196, dated Aug. 20, 2010 (Response).
Document relating to Canadian Application No. 2,579,541, dated Feb. 10, 2012 (Office Action).
Document relating to EP 06110449.3, dated Aug. 10, 2006 (Reply to Exam Report).
Document relating to EP 06110449.3, dated Oct. 8, 2007 (Reply to Exam Report).
Document relating to U.S. Appl. No. 12/468,441, dated Sep. 9, 2010 (Express Abandon).
Document relating to U.S. Appl. No. 12/468,441, dated Sep. 14, 2010 (Notice of Abandon).
Document relating to EP 06110449.3, dated Apr. 17, 2009(Decision to grant a European patent).
Document relating to U.S. Appl. No. 13/618,311, dated Jan. 17, 2013 (Non-Final Office Action).
Document relating to U.S. Appl. No. 13/618,311, dated Apr. 17, 2013 (Response).
Document relating to U.S. Appl. No. 13/618,311, dated Jun. 28, 2013 (Office Action).
Document "Access Control: Policies, Models, and Mechanisms" by Samarati and Capitani de Vimercati in Foundations of Security Analysis and Design, Lecture Notes in Computer Science, vol. 2171, 2001, pp. 137-196.
Article "Managing Authorization and Access Control", published by Microsoft online at http://technet.microsoft.com/en-us/library/bb457115 and published Nov. 3, 2005.
Lecture "Access Control" by Michael Clarkson, at https://www.cs.cornell.edu/courses/cs513/2007fa/NL.accessControl.html, Fall of 2007.
"Access Control List" Wikipedia entry at http://en.wikipedia.org/wiki/Access_control_list, retrieved Jun. 5, 2013.
Document relating to U.S. Appl. No. 12/885,281, dated Sep. 29, 2010 (Preliminary Amendment).
Document relating to U.S. Appl. No. 13/618,311, dated Sep. 19, 2013 (Amendment).

Document relating to Canadian Application No. 2,579,541, dated Jan. 8, 2013 (Notice of Allowance).
Document relating to EP Application No. 06110449.3, dated Nov. 3, 2008 (European Communication under Rule 71(3) EPC).
Microsoft: "Computer Dictionary" Microsoft Press, Dec. 31, 2002, p. 33, XP001147934.
Document relating to EP Application No. 05111046, dated Jun. 9, 2006 (Extended European Search and Examination Report).
Document relating to EP Application No. 05111046, dated Jun. 28, 2007 (Exam Report).
Nobels, Jonathan, Research in Motion Limited, "Give Me a Sign", BlackBerry Developer Journal, Writing Efficient 32ME Software, 3 pages, May 2004 http://www.blackberry.com/developers/journal/may 2004/give me a sign.shtml.
Research in Motion Limited, BlackBerry Wireless application deployment in the enterprise, originally posted: Feb. 2003, last revised: Jul. 2003, 4 pages, www.blackberry.com.
Research in Motion Limited, BlackBerry Java Development Environment Version 3.6 Developer Guide vol. 2—Advanced Topics, Mar. 24, 2003, chapter 1, Using Controlled Apls.
Research in Motion Limited, Controlled APIs, 3 pages from blackberry. com printed Dec. 2, 2004 http://www.blackberry.com/developers/na/javaltools/controllledAPIs.shtml.
Document relating to U.S. Appl. No. 12/885,281, dated Nov. 12, 2013 (Non-Final Rejection).
Research in Motion Limited, BlackBerry IT Policy Manager, 19 pages, 2002.
Research in Motion Limited, Implementing the IT Policy Manager for BlackBerry, 12 pages, originally posted Mar. 2002.
Document relating to EP Application No. 06110449.3, dated Mar. 30, 2007 (Exam Report).
Document relating to U.S. Appl. No. 12/885,281, dated Apr. 3, 2014 (Office Action).
Document relating to U.S. Appl. No. 12/885,281, dated Jun. 27, 2014 (Response).
Document relating to U.S. Appl. No. 12/885,281, dated Jul. 16, 2014 (Notice of Allowance).
Document relating to U.S. Appl. No. 13/618,311, dated Apr. 2, 2014 (Office Action).
Document relating to U.S. Appl. No. 13/618,311, dated Jun. 27, 2014 (Response).
Document relating to U.S. Appl. No. 13/618,311, dated Jul. 10, 2014 (Notice of Allowance).
Terminal Disclaimer. U.S. Appl. No. 13/618,311. Dated: Oct. 14, 2014.
Petition to Withdraw an Application from Issue After Payment of the Issue Fee under 37 CFR 1.313(c). U.S. Appl. No. 13/618,311, Dated: Nov. 20, 2014.
Request for Continued Examination (RCE). U.S. Appl. No. 13/618,311. Dated: Nov. 20, 2014.
Patent Withdrawal Notice. U.S. Appl. No. 13/618,311. Dated: Nov. 28, 2014.
Notice of Allowance. U.S. Appl. No. 13/618,311. Dated: Jan. 7, 2015.
Rooker, T: "The Reference Monitor: An Idea Whose Time Has Come" Proceedings. ACM SIGSAC New Security Paradigms Workshop, Proceedings of New Security Paradigms Workshop. Aug. 3, 1993, pp. 192-197, XP001147934.
Document relating to EP Application No. 06110449, dated May 29, 2006 (Search/Exam Report).
Blackberry Security White Paper Release 4.0, 2004.
Wireless IT Policy and IT Administration. Blackberry Enterprise Server version 3.5 for Microsoft Exchange, 2002.
Research in Motion Limited, BlackBerry Application Security for Java-based BlackBerry Handhelds, originally posted: Feb. 2003,5 pages, www.blackberry.com.
Document relating to U.S. Appl. No. 13/618,311, dated Oct. 30, 2013 (Final Rejection).
Document relating to U.S. Appl. No. 13/618,311, dated Dec. 16, 2013 (Response After Final Rejection).
Document relating to U.S. Appl. No. 13/618,311, dated Jan. 3, 2014 (Advisory Action).

(56) References Cited

OTHER PUBLICATIONS

Document relating to U.S. Appl. No. 13/618,311, dated Jan. 30, 2014 (Notice of Appeal and Pre-Brief Conference Request).
Document relating to U.S. Appl. No. 12/885,281, dated Feb. 14, 2014 (Response).
Prosecution Documents for U.S. Appl. No. 13/612,048, issue fee paid on Feb. 27, 2014.
Document relating to U.S. Appl. No. 13/618,311, dated Mar. 11, 2014 (Pre-Brief Appeal Conference Decision).

* cited by examiner

IT Policy Table 300

| Rule ID (302) | Sub-rule ID (304) | Policy Rule Name (306) | Per-user Settable (308) | Description (310) | Data Type (312) | Constraints (314) |
|---|---|---|---|---|---|---|
| ⋮ | ⋮ | ⋮ | ⋮ | ⋮ | ⋮ | ⋮ |

FIG. 5

Global IT Policy Table 330

| ID (332) | Policy Name (334) | Global IT Policy Data (336) | Update (338) |
|---|---|---|---|
| ⋮ | ⋮ | ⋮ | ⋮ |

FIG. 6

User IT Policy Table 360

| ID (362) | User ID (364) | Per-User IT Policy Data (366) | Update (368) |
|---|---|---|---|
| ⋮ | ⋮ | ⋮ | ⋮ |

FIG. 7

METHOD OF CUSTOMIZING A STANDARDIZED IT POLICY

CROSS-REFERENCE TO RELATED APPLICATION

This application is a continuation of U.S. patent application Ser. No. 13/612,048, filed Sep. 12, 2012, which is a continuation of U.S. patent application Ser. No. 11/362,481, filed Feb. 27, 2006. U.S. patent application Ser. No. 11/362,481 issued to patent as U.S. Pat. No. 8,332,906. The entire contents of U.S. patent application Ser. No. 13/612,048 and U.S. patent application Ser. No. 11/362,481 are hereby incorporated by reference.

FIELD

The embodiments described herein relate generally to standardizing IT policy for configuring devices in a network.

BACKGROUND

An IT policy is a set of rules that dictate the functionality of a device that operates on a network. Accordingly, an IT administrator can use IT policy to ensure that all devices comply with certain rules, and are limited to certain functionality. For instance, the IT administrator can use IT policy to allow the use of certain features on a device (such as cell phone use), specify certain security settings for the device (such as minimum password length), specify applications that are allowed to execute on the device, and the like. The IT policy can be sent to the device via a wired or wireless connection depending on the nature of the network and whether or not the device is connected by a wired connection.

Although the same IT policy generally applies to all users within a group, there can be some exceptions in which some additional or different rules apply to some specific users within the group. To accommodate these user exceptions, one approach can be to create a new IT policy that covers each of the user exceptions. However, this results in greater complexity when managing IT policy information, especially when the number of user exceptions are high.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which:

FIG. 5 is an illustration of an exemplary embodiment of a table containing definitions for the set of IT policy rules that can be set in an instance of an IT policy;

FIG. 6 is an illustration of an exemplary embodiment of a table with fields related to global IT policy;

FIG. 7 is an illustration of an exemplary embodiment of a table with fields related to per-user IT policy; and, FIG. 8 is a flowchart diagram of an exemplary embodiment of a method for generating IT policy data.

DETAILED DESCRIPTION

Figure 1:
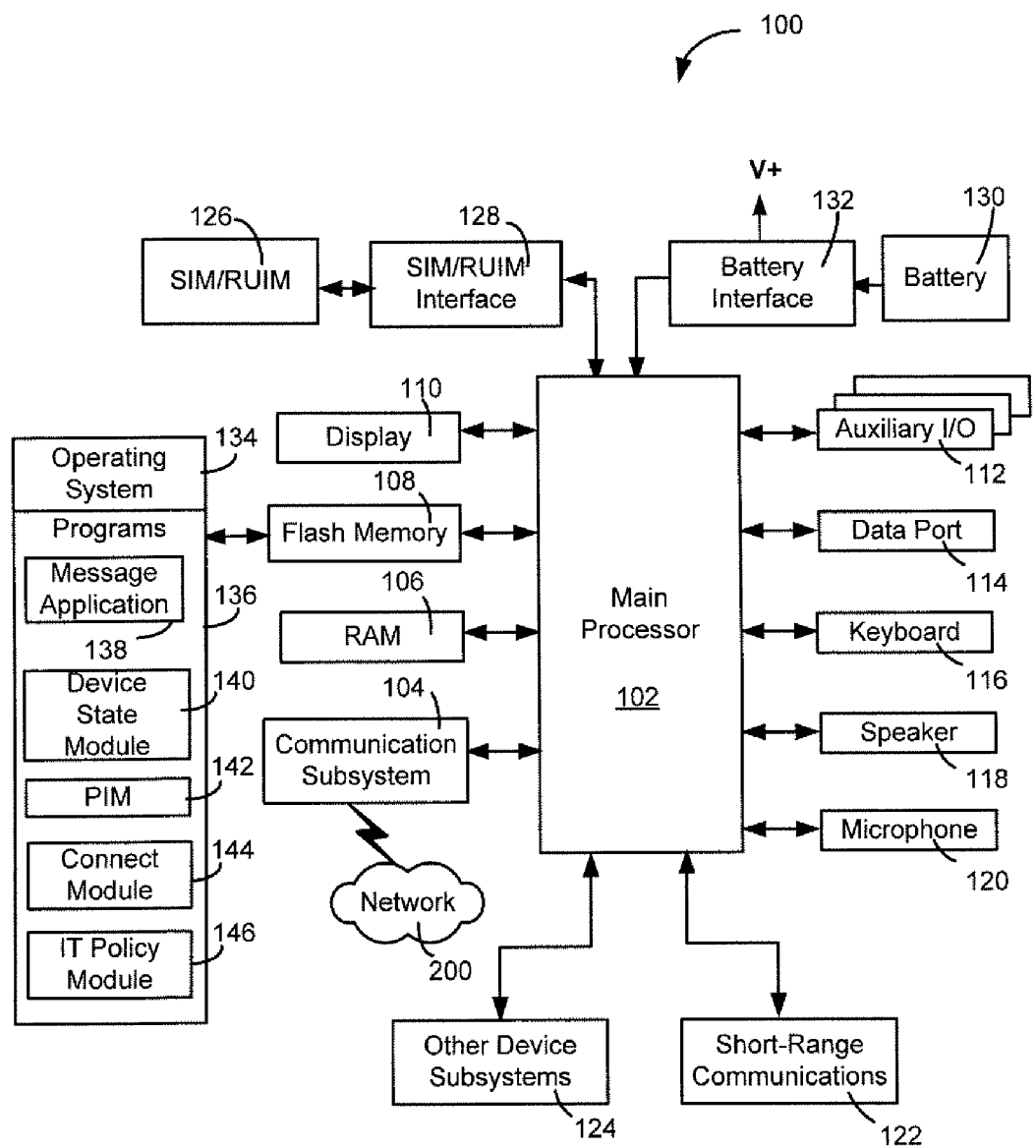
FIG. 1 is a block diagram of an exemplary embodiment of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
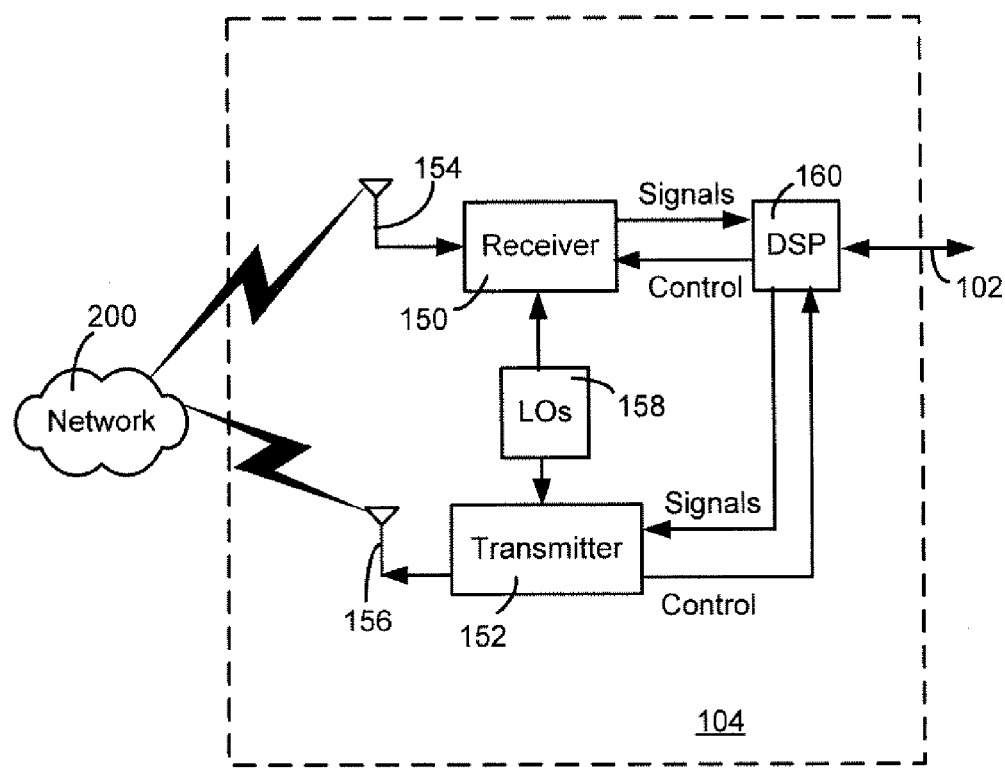
FIG. 2 is a block diagram of an exemplary embodiment of a communication subsystem component of the mobile device of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
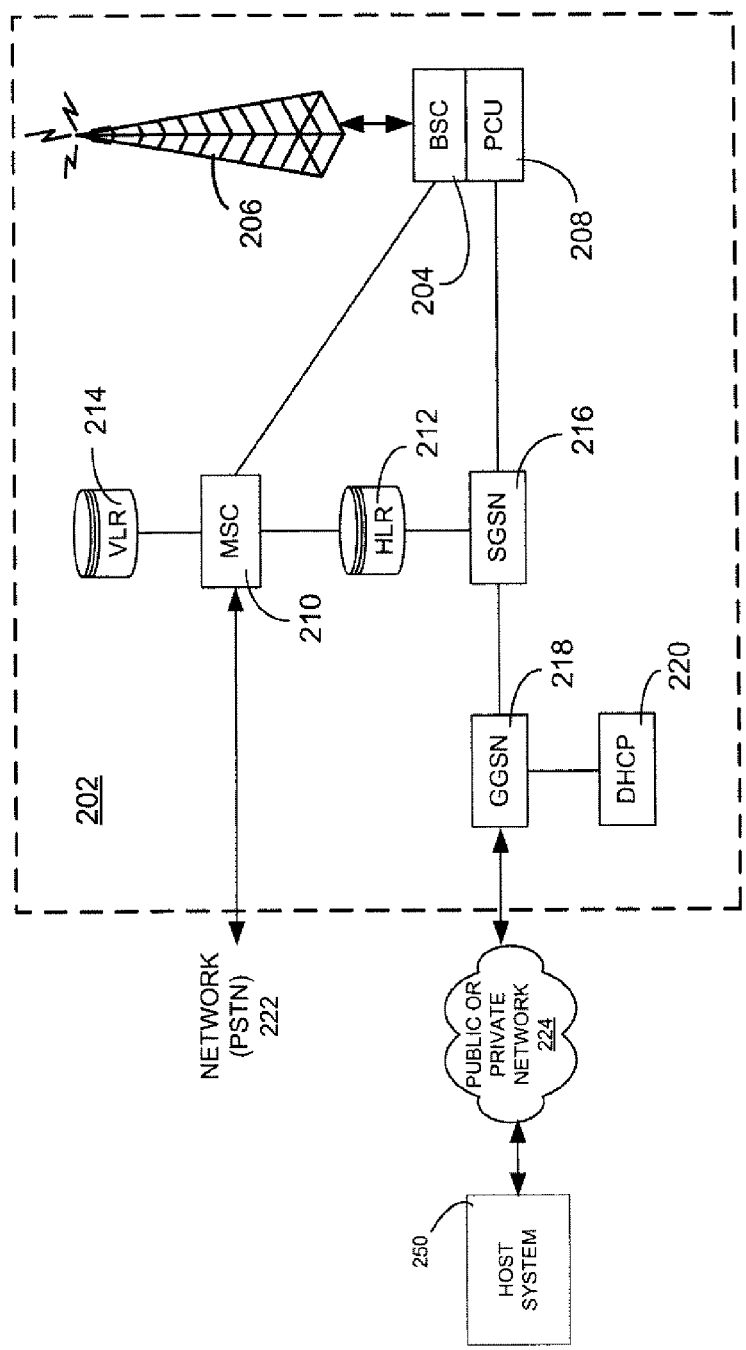
FIG. 3 is an exemplary block diagram of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the mobile device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
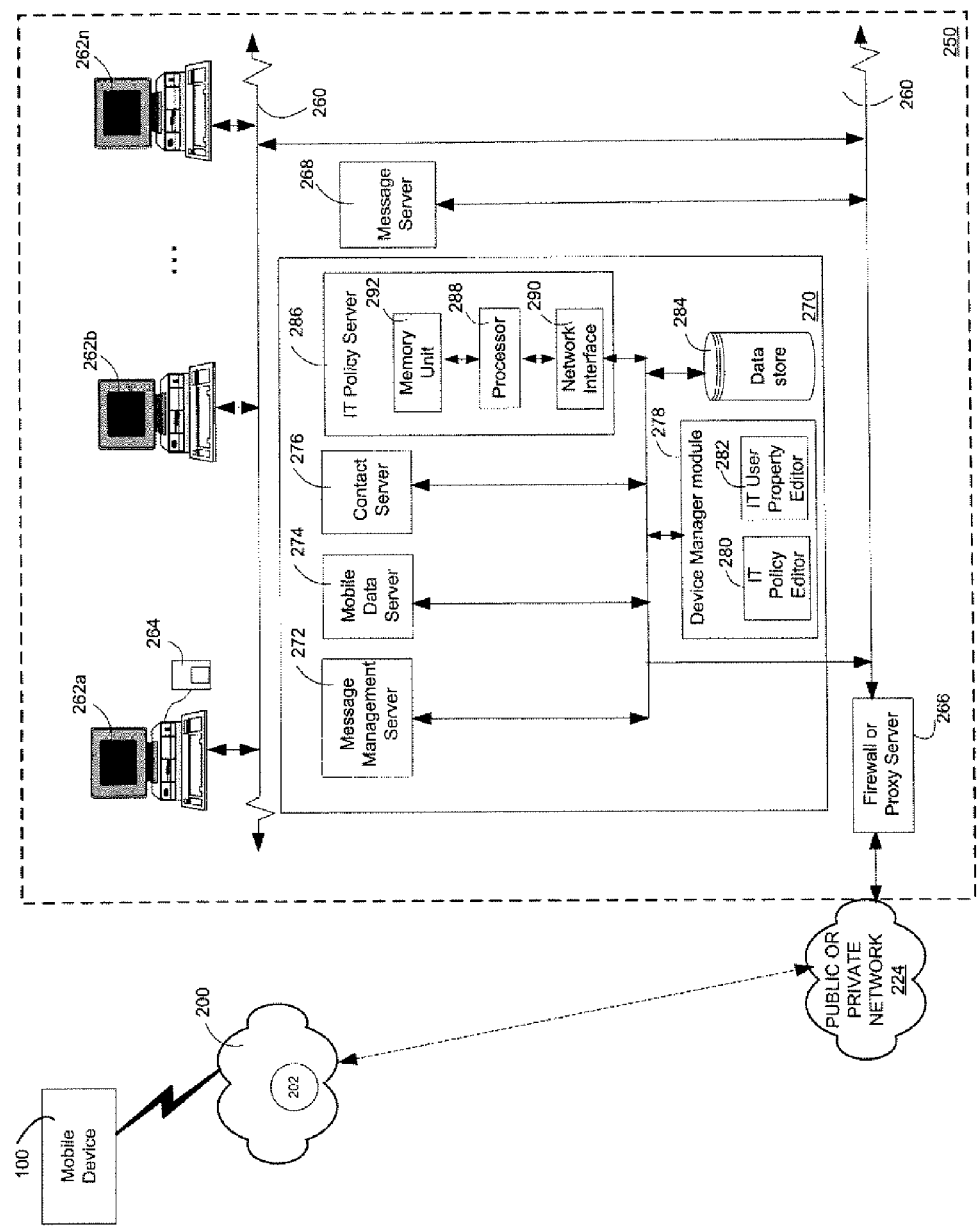
FIG. 4 is a block diagram illustrating components of a host system in one exemplary configuration for use with the wireless network of FIG. 3 and the mobile device of FIG. 1.

Referring now to FIG. 4, shown therein is a block diagram illustrating components of an exemplary configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

Definitions of known supported IT policy rules can be distributed by way of bundling them with the messaging service software, or as a standalone update that can be applied to an IT policy table. Alternatively, and in addition to the distribution of proprietary rules, IT administrators can invoke the IT policy editor 280 to add or modify existing custom IT policy rules to be used by their own or third-party applications. FIG. 5 shows an exemplary IT policy table 300. The IT policy table 300 can be stored in an appropriate management database in the data store 284. For each IT policy rule, within the various fields in the IT policy table 300, the functionality and form of the IT policy rule is defined and rules governing how it is applied to users, groups of users and devices are included in this definition. For instance, a given record in the IT policy table 300 includes a rule ID field 302, a sub-rule ID field 304, a policy rule name field 306, a per-user settable field 308, a description field 310, a data type field 312 and a constraints field 314. These fields are shown for exemplary purposes. In some embodiments, the IT policy table 300 may have more or fewer fields than those shown. In some embodiments, some of the fields shown in FIG. 5 can be further broken down into several fields.

The rule ID field 302 provides an ID, such as a number, for a given IT policy rule. An IT policy rule can be considered to be either a non-grouped or grouped IT policy rule. A grouped IT policy rule contains at least one sub-IT policy rule with a distinct sub-rule ID, such as a number, that is recorded in the item field 304. For example, the IT policy rules "Allow Phone" and "Allow Browser" are examples of non-grouped IT policy rules because there are no sub-IT policy rules that are used to define an aspect or characteristic of these IT policy rules. Accordingly, the values in the sub-rule ID field 304 for the "Allow Phone" and "Allow Browser" non-grouped IT policy rules are both 0.

An example of a grouped IT policy rule is a "Password Policy" group IT policy rule which includes the sub-IT policy rules "Set Password Timeout", and "Set Maximum Password Attempts", as well as other rules. The values in the sub-rule ID field 304 that correspond to the "Password Policy", "Set Password Timeout" and "Set Maximum Password Attempts" policy rules can be 0, 1 and 2 respectively. Accordingly, the entry in the sub-rule ID field 304 is incremented for each sub-IT policy rule that is part of a grouped policy rule. The entry in the rule ID field 302 is incremented for each new non-grouped IT policy rule or grouped IT policy rule, but not for sub-IT policy rules because they will share the same number in the rule ID field 302 as the grouped IT policy rule to which they belong.

The policy rule name field 306 includes a text string that identifies the name of the IT policy rule. The per-user settable field 308 indicates whether the IT policy rule can be applied on a per-user basis. This can be indicated by using a Boolean value of 0 or 1 within field 308 to indicate that the rule is settable on a global or per-user basis respectively. Alternatively, in some embodiments, the per-user settable field 308 can be replaced with a more generic field indicating applicability on a per-user, global, and universal basis, or a combination thereof by using a bit mask value, for example. Some of the non-grouped or grouped IT policy rules that are per-user settable can be applied to some users within a group on an individual basis. Such rules may be settable in the global IT policy as well, and it is up to the IT policy server 286 to ensure that if a rule is set in both the global IT policy and the per-user IT policy, then the value specified in the per-user IT policy prevails. Accordingly, all of the non-grouped or grouped IT policy rules that are set in the global IT policy are applied to all users in the group to which the global IT policy applies. Some examples of per-user IT policy rules include, but are not limited to, the "VPN Policy" IT policy group, with sub-IT policy rules "VPN User Name" and "VPN User Password", and the "WLAN Policy" IT policy group, with sub-IT policy rules "WLAN User Name" and "WLAN User Password".

The description field 310 includes a description of the functionality of the IT policy rule, which devices the IT policy rule can be applied to, and the software versions of the various components in the system 250 or the mobile device 100. The data type field 312 indicates the data type for the value that is set for an IT policy rule, such as binary, string, integer, etc. The constraints field 314 can indicate a range of acceptable values for the values used in the IT policy rules. For example, the constraint field 314 can indicate a range of acceptable values for integer-valued rules, a set of discrete values for integer-valued rules, a set of name-value pairs for enumerated integer-valued rules, labels for the bit values in a bitmask-valued rule, the minimum and/or maximum character lengths for string-valued rules, or a name of a validator that can be used to test values assigned to string-valued rules. In some embodiments, the constraints field 314 may be a combination of multiple fields that together form a complete set of constraints.

In at least some embodiments, Tag-Length-Value (TLV) encoding can be used to encode an IT policy rule and produce a packet of IT policy data. The TLV encoding format assumes a unique identifier for an IT policy rule by using a rule ID for non-grouped IT policy rules, and rule ID and sub-rule ID for grouped IT policy rules. For example, the TLV encoding format for a non-grouped IT policy rule is: [tag][length][value]. The tag field is the rule ID that corresponds to the particular non-grouped IT policy rule that is being encoded. The rule ID is encoded in field 302 of table 300 for a given IT policy rule. The length field indicates the data length of the information in the value field. The value field indicates the value that is set for the non-grouped IT policy rule and is selected to be within the range of values specified in the constraints field 314 in the IT policy table 300. In general, each of the tag, length and value fields can be encoded using one or more octets (i.e. bytes), in which the number of octets depends on the size of the information that is being encoded. This also applies to grouped IT policy rules although the TLV format is slightly different.

As an example of encoding a non-grouped IT policy rule, consider the Boolean-valued IT policy rule "Allow Phone" which controls whether it is permissible to use the phone application on the mobile device 100. Assuming that the value in the rule ID field is 1, and that the value of this IT policy rule is set to False, the corresponding TLV sequence is [0x01][0x01][0x00] where the first octet [0x01] indicates that the rule ID is 1, the second octet [0x01] indicates that the length of the data encoding the value is 1 (i.e. a single octet), and the final octet [0x00] indicates that the value is 0 (for this example, indicating the value of the IT policy rule is False). The "0x" indicates that a hexadecimal number is used to represent the value of the octet.

For grouped IT policy rules, the TLV format can use the format: [tag][length]([subtag1][length1][value1][subtag2][length2][value 2] . . . ). The tag field identifies the grouped IT policy rule (i.e. the "category" for the sub-IT policy rules that will follow), and the subtag field (combined with the tag field) uniquely defines the particular sub-IT policy rules. The value in the tag field corresponds to the entry in the rule ID field (i.e. in field 302 in table 300) for a given grouped IT policy rule, and the values in the subtag fields correspond to the entries in the sub-rule ID fields (i.e. in field 304 in table 300) for the given sub-IT policy rules. At least one sub-IT policy rule can be defined, although two or more sub-IT policy rules can be defined as well.

As an example of encoding a grouped IT policy rule, consider the integer-valued sub-IT policy rule "Set Maximum Password Attempts" that is used to set the maximum number of times an incorrect password can be entered when a user tries to log onto a mobile device. This sub-IT policy rule is defined as sub-rule 2 within the "Password Policy" grouped IT policy rule, which has a rule number of 22. Accordingly, the tag field encodes the value 22 and the subtag field encodes the value 2. If the value for this sub-IT policy rule is set to 6, the corresponding IT policy data packet is: [0x16][0x03]([0x02][0x01][0x06]) where the first octet [0x16] indicates that the rule ID for this grouped IT policy rule is 22. The second octet [0x03] indicates that the length of the sub-IT policy information (which is enclosed in parentheses for emphasis) specified in this IT policy data packet is three bytes or octets. The octet [0x02] indicates that the sub-rule ID for the sub-IT policy rule that is encoded is 2. The octet [0x01] indicates that the length of the value for the sub-IT policy rule is 1 octet, and the octet [0x06] indicates the value of 6 for the sub-IT policy rule.

The rule and sub-rule ID designations in the IT Policy table 300 are consistent with values coded in the software on the mobile device 100 in order to be properly applied and enforced on the mobile device 100. The software on the mobile device 100 also knows the data type associated with a non-grouped or grouped IT policy rule, and the supported range of values. The parser associated with the IT policy module 146 parses the values in the IT policy data accordingly. An IT policy rule in the IT policy data that is received at the mobile device 100 which is not supported by the software on the mobile device 100 may be ignored by the mobile device 100. Accordingly, for new IT policy rules to be supported, new software that responds to these rules needs to be loaded onto the mobile device 100.

All of the users within an organization are required to have an IT policy assigned to their mobile device. The most basic IT policy can be a "Default" IT policy that contains no IT policy rules. It is up to the IT administrator to define the IT policies for the organization, and to assign the IT policies to various users of the organization in accordance with their usage regulation. Once the IT policy is defined, it is typically assigned to a group of users. In this case, the term global IT policy can be used for the IT policy that is applied to all of the users within a group. The IT policy is then sent to the mobile devices used by the users within the group. Any subsequent changes to the given IT policy will be sent to all users who are assigned that IT policy.

The IT administrator can use the IT policy editor 280 to define the global IT policy rules for an IT policy and then assign the IT policy to a group of users. The global IT policy rules can include various combinations of non-grouped or grouped IT policy rules as needed.

Information corresponding to the created IT policy can be indicated in a global IT policy table that can be part of the management database which can be stored in the data store 284. An exemplary global IT policy table 330 is shown in FIG. 6. In general, the global IT policy table 330 includes an ID field 332, a policy name field 334, a global data field 336, and an update field 338. When a user is assigned to a global IT policy, the value of the ID field 332 is copied into the user's User_Config table entry (not shown) as the user's global IT policy ID property.

The ID field 332 contains a unique identifier for a given record in the global IT policy table 330 that corresponds to a unique global IT policy. The ID field 332 typically includes an integer that incrementally increases for successive records. The policy name field 334 includes a string value for defining the name of the global IT policy. Examples include: "Default", "Policy for Managers", etc. The global data field 336 includes global IT policy data that is sent to the mobile devices 100. The global IT policy data can be generated using TLV encoding on the IT policy rules that correspond to a particular global IT policy, and in some embodiments can be implemented as a blob (i.e. a binary large object). The update field 338 can be used to indicate, by way of a Boolean value or a time stamp for example, that the global IT policy data in field 336 has been modified and needs to be sent to the users to which the global IT policy applies. If field 338 contains a Boolean value, once the global IT policy data has been successfully sent to all applicable users, the value in field 338 can be reset to indicate that there is no new group IT policy data that needs to be transmitted to the users that correspond to the global IT policy. If field 338 contains a timestamp, once the global IT policy data has been successfully sent to all applicable users, the timestamp value in field 338 can then be used as a reference point such that global IT policy records with timestamp values in field 338 that are higher than this value are considered to be "new data" that needs to be sent to users. In embodiments that do not include an update field 338, the IT policy editor 280 could inform the IT policy server 286 of changes to a global IT policy by way of an alternative notification mechanism as is commonly known by those skilled in the art.

The IT administrator can also configure the IT policy on a per-user basis for a given user by making use of per-user IT policy rules. For setting values for per-user IT policy rules for the given user, the IT administrator can interact with the IT user property editor 282 to assign certain values for one or more per-user IT policy rules to the given user. These per-user IT policy rules can then be combined or merged with any global IT policy rules that apply for the given user. The merge operation is described in more detail below.

The per-user IT policy rules that have been applied to individual users, can be tracked in a user IT policy table. FIG. 7 shows an exemplary user IT policy table 360. In general, the user IT policy table 360 includes an ID field 362, a user ID field 364, a user data field 366 and an update field 368. A record is created in the user IT policy table 360 when a per-user IT policy rule is set for a given user, and persists thereafter. The user IT policy table 360 can be stored in the management database or in another location on the data store 284 or another suitable data storage element. Generally, not every user will have a record in the user IT policy table 360.

The ID field 362 includes a unique identifier for a given record in the user IT policy table 360. The ID field 362 typically includes an incrementally increasing integer for successive records. The user ID field 364 indicates the ID value for a user record in the User_Config table (not shown) that corresponds to the given user for which per-user IT policy rules are being applied. The User_Config table includes data for each user that interacts with the host system 250. The per-user IT policy data field 366 includes per-user IT policy data that encodes the per-user IT policy rules that have been set for the given user. Once again, the per-user IT policy data can be encoded using TLV encoding, and in some embodiments can be implemented as a blob. The update field 368 is similar to the update field 338.

The IT administrator can use the global and user IT policy tables to define global IT policies as well as more specialized per-user IT policies, which can then be merged, if needed, when sending an IT policy to users within a group. This allows the IT administrator to create a general global IT policy that generally applies to all users within a group while having the ability to make some modifications or exceptions for special users in the group without having to define a new IT policy for each of these special users and save the new IT policy in an IT policy table. Rather, when a change is made to a global IT policy, the users for which the global IT policy applies are noted, and the user IT policy table 360 is checked to see if any of those users are special users that have per-user IT policy rules defined for them. If so, for those special users, the IT policy data is created by merging the global IT policy data (i.e. in field 336) with the per-user IT policy data (i.e. in field 366). The merged data then forms the IT policy data, which is then sent to the mobile devices used by the special users.

Figure 8:
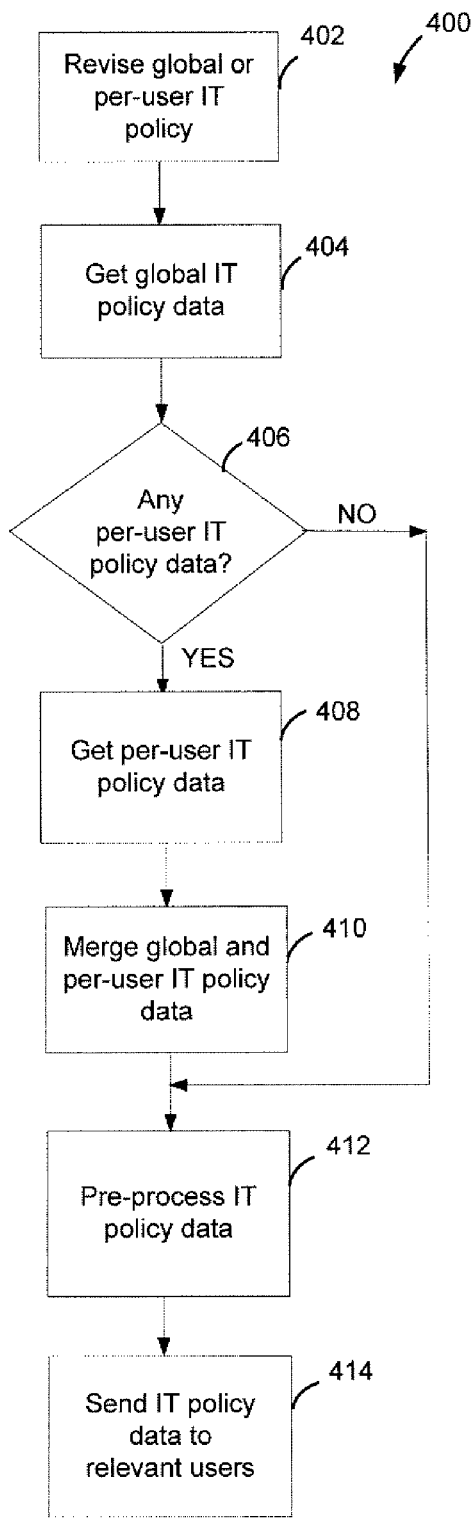

Referring now to FIG. 8, shown therein is a flowchart diagram of an exemplary embodiment of a method 400 for generating IT policy data. At step 402, a revision is made to global IT policy data and/or to per-user IT policy data. For instance, the IT administrator may define a new global IT policy, add new global IT policy rules to an existing global IT policy or revise the values of one or more global IT policy rules for an existing global IT policy. In any of these cases, new global IT policy data is stored in field 336 for the global IT policy table 330. Alternatively, the IT administrator may set one or more per-user IT policy rules for one or more special users within a group of users. In this case, new per-user IT policy data is stored in field 366 for the user IT policy table 360. In another alternative, the IT administrator can make changes to both global IT policy data and per-user IT policy data.

Accordingly, there are generally three scenarios for step 402. There can be a global IT policy change in which case the new global IT policy data, and per-user IT policy data if applicable, is sent to all users associated with the global IT policy. There can be a per-user IT policy change in which case the new per-user IT policy data and corresponding global IT policy data is sent to all of the special users whose per-user IT policy has changed. There can also be both a global IT policy change and a per-user IT policy change in which case global IT policy data is sent to all users associated with the global IT policy that has changed, and the new per-user IT policy data is also sent to all special users associated with the global IT policy, regardless of whether the per-user IT policy has changed. Alternatively, in some embodiments, the per-user IT policy data may not be sent if it has not changed.

In all of these cases, the global IT policy data needs to be merged with the per-user IT policy data (if it exists) before sending the new IT policy data to the affected users. In some embodiments, this can be done by the IT policy server 286. When the IT administrator has finished making changes to global IT policy data, or to per-user IT policy data, the device manager module 280 stores the changes in the corresponding tables. The IT policy server 286 can then be notified by the device manager module 278 that changes have been made to these tables, or the IT policy server 286 can monitor these tables for changes. Accordingly, the IT policy server 286 can poll the management database for changes in tables 330 and/or 360, or it can receive a notification from the device manager module 278 or the management database. In another alternative, once these changes have been made, the device manager module 278 may automatically queue the IT policy to the affected users. The IT policy server 286 can monitor this queue.

The global IT policy data associated with a user can be determined by looking at a global IT policy ID property value in the user's record in the User_Config table; this value will correspond to one of the records in the global IT policy table 330. The per-user IT policy associated with a user can be defined by determining the record in the user IT policy table 360 for which the value of the user ID field 364 matches the user's ID for the user's record in the User_Config table. This information can be used in steps 404 and 408 of the method 400 to obtain global and per-user IT policy data.

At step 404, if changes have been made to global IT policy data, the method 400 includes retrieving the global IT policy data from the appropriate record of the global IT policy table 300. This can be done by looking at the update field 338 for records in the global IT policy table 300 that have been recently updated. The IT policy server 286 can perform this operation.

If changes have been made to the per-user IT policy data, then the IT policy server 286 can first determine the users associated with the changed per-user IT policy. This can be done by checking the update field 368 in the user IT policy table 360 to locate recently updated records. The values in the user ID field 364 for these records can then be examined to determine the users for which the change in per-user IT policy data has been made. The user IDs can then be used to index into the corresponding entries in the User_Config table to determine the value of the global IT policy ID property for these users to determine the group IT policy ID. The group IT policy ID can then be used as an index for the ID field 332 of the global IT policy table 330 in order to retrieve the corresponding global IT policy data.

At step 406, the method 400 determines if there is any corresponding user IT policy data for the users that are associated with the global IT policy identified in step 404. The IT policy server 286 can perform this operation. If changes were made to global IT policy data, the global IT policy ID from record 332 of table 330 was determined in step 404, and the IT policy server 286 can then determine all of the users associated with the global IT policy by looking for users whose global IT policy ID property value in the User_Config table corresponds to the global IT policy ID. The entries in the user ID field 364 for the records in the user IT policy table 360 can then be searched for any matches. If there are no matches, the method 400 moves to step 412. If there are matches, then the method 400 moves to step 408. For each match, the per-user IT policy data in field 366 of the user IT policy table 360 is retrieved. Otherwise, if the changes that occurred at step 402 were due to changes in per-user IT policy data, then the method 400 moves to step 408 at which point the per-user IT policy data in field 366 of the user IT policy table 360 can be retrieved for recently updated records which can be identified by viewing the values in the update field 368.

After step 408, the method 400 moves to step 410 at which point the global IT policy data is merged with the per-user IT policy data. The global IT policy data and the per-user IT policy data are merged such that data for sub-IT policy rules for grouped IT policy rules common to both the global and per-user IT policy data are placed together in the final merged IT policy data. Further, any IT policy rule that appears in both the global and per-user IT policy data will appear only once in the final merged data, to avoid duplicates, and the value used in the merged IT policy data will be the value specified in the per-user IT policy data.

Accordingly, it should be understood that if IT policy data is to be sent to a user, the global IT policy data and the per-user IT policy data (if it exists for the users associated with the global IT policy data) are merged to form updated or merged IT policy data. The merged IT policy data is then sent to the affected users. Changes in global IT policy data versus per-user IT policy data only determine the set of users who will receive the updated IT policy data. Accordingly, the updated IT policy data that is sent to a given user is always complete and up-to-date.

An example of a merge is now given. Assuming that the global IT policy contains the sub-IT policy rules "WLAN SSID" (the sub-rule ID is 3 ([0x03])) set to "aaaa", and "WLAN IP Address" (the sub-rule ID is 13 ([0x0d])) set to "1.1.1.1", and that the rule ID is 40. The IT policy data in TLV format is:
[0x28][0x0f]
([0x03][0x04][0x61][0x61][0x61][0x61]
[0x0d][0x07][0x31][0x2e][0x31][0x2e][0x31][0x2e]
 [0x31])
The line breaks and parentheses have been added here (and in examples that follow) to aid in seeing the specific IT policy rule settings; accordingly, the above sequence of bytes should be considered to be contiguous. Now, assume that the per-user sub-IT policy rules "WLAN User Name" (sub-rule ID is 10 ([0x0a])) is set to "jdoe", and "WLAN User Password" (sub-rule ID is 11 ([0x0b])) is set to "pass", then the resulting per-user IT policy data in TLV format is:
[0x28][0x0c]
([0x0a][0x04][0x6a][0x64][0x6f][0x65]
[0x0b][0x04][0x70][0x61][0x73][0x73])
The IT policy server 286 merges the two IT policy data blocks into the following IT policy data block:
[0x28][0x1b]
([0x03][0x04][0x61][0x61][0x61][0x61]
[0x0a][0x04][0x6a][0x64][0x6f][0x65]
[0x0b][0x04][0x70][0x61][0x73][0x73]
[0x0d][0x07][0x31][0x2e][0x31][0x2e][0x31][0x2e]
 [0x31])

As previously mentioned, in at least some embodiments, if values for a common, or otherwise conflicting, IT policy rule is set in both the global and per-user IT policy data blocks, the merge will override or replace the value set in the global IT policy data block with the value set in the per-user IT policy data block. An example of an override based on the previous example now follows.

Assuming that the global IT policy rules contain WLAN settings "WLAN SSID" (the sub-rule ID is 3 ([0x03])) set to "aaaa", "WLAN User Name" (the sub-rule ID is 10 ([0x0a])) set to "jack", "WLAN User Password" (the sub-rule ID is 11 ([0x0b])) set to "jill", and "WLAN IP Address" (the sub-rule ID is 13 ([0x0d])) set to "1.1.1.1", and the rule ID to which these global sub-IT policy rules correspond is 40, then the global IT policy data is:
[0x28][0x1b]
([0x03][0x04][0x61][0x61][0x61][0x61]
[0x0a][0x04][0x6a][0x61][0x63][0x6b]
[0x0b][0x04][0x6a][0x69][0x6c][0x6c]
[0x0d][0x07][0x31][0x2e][0x31][0x2e][0x31][0x2e]
 [0x31])
Now, assume that per-user IT policy rules have been defined as follows: "WLAN User Name" (the sub-rule ID is 10 ([0x0a])) is set to "jdoe", and "WLAN User Password" (the sub-rule ID is 11 ([0x0b])) is set to "pass", then the resulting per-user IT policy data block for this particular user is:
[0x28][0x0c]
([0x0a][0x04][0x6a][0x64][0x6f][0x65]
[0x0b][0x04][0x70][0x61][0x73][0x73])
When the IT policy server 286 merges the global and per-user IT policy data blocks, the resulting IT policy data block is as follows (the overridden data is highlighted with bold lettering):
[0x28][0x1b]
([0x03][0x04][0x61][0x61][0x61][0x61]
[0x0a][0x04][0x6a][0x64][0x6f][0x65]
[0x0b][0x04][0x70][0x61][0x73][0x73]
[0x0d][0x07][0x31][0x2e][0x31][0x2e][0x31][0x2e]
 [0x31])

At step 412, preprocessing is performed on the IT policy data before the IT policy data is sent to the mobile devices of the relevant users. This includes performing normal pre-processing, such as adding a header to the IT policy data so that the data is sent to the correct mobile device 100 and to ensure the mobile device 100 interprets the data as IT policy data. In addition security data can be added, as is commonly known to those skilled in the art, so that the mobile device 100 can check any received IT policy data for authenticity. Further, if the data is sent to the mobile device 100 wirelessly, then the data can be formatted for over-the-air delivery as is commonly known by those skilled in the art.

At step 414, all users associated with an IT policy change will receive the new IT policy data if it differs from the IT policy that is currently applied to the user's mobile device 100. This can be done by checking the newly generated IT policy data against the last IT policy data that was sent to the mobile device 100 to see if there are any differences. This can be accomplished by comparing the IT policy data in memory after merging the per-user IT policy data with the global IT policy data, then comparing the resulting IT policy data with the IT policy data that is about to be sent to that user. If there is a difference, the new IT policy data is sent to the relevant users. In at least some embodiments, an IT policy status table (not shown) can be used to store the last IT policy data that was sent to a user.

In some implementations, the IT policy data can be sent to a dispatcher, which passes it onto a router, which in turn passes the data onto a relay which transmits it through the wireless network infrastructure to the mobile devices that correspond to the users affected by the change in the global and/or per-user IT policy (the dispatcher, router and relay are not shown in FIG. 4). The IT policy module 146 on the mobile device 100 then receives, authenticates and validates the IT policy data. If the IT policy data is authentic and valid, the IT policy module 146 then stores it in non-volatile memory on the mobile device 100, and informs relevant applications on the mobile device 100 of new IT policy data. The relevant applications then incorporate the new IT policy data. In some implementations, the IT policy module 146 can also apply some of the IT policy rules in the new IT policy data to relevant files such as configuration files, for example. The IT policy module 146 then sends an acknowledgement back to the IT policy server 286 that the new IT policy data has been received and applied. The IT policy server 286 receives and parses the acknowledgement and writes the status (success or fail) to relevant IT policy tables in the management database.

When a new set of IT policy rules is sent to a mobile device 100, the current IT policy rule set is cleared from the mobile device 100 and the new IT policy rule set is put into force. Therefore, before a new IT policy is sent to a mobile device, the global IT policy and the per-user IT policy are merged so that the user receives an updated IT policy that is complete and up-to-date, as mentioned previously.

The embodiments described herein can be used to configure wireless or wired endpoint devices according to an IT policy having a possible combination of global and per-user IT policy rules. Accordingly, the embodiments can be used to efficiently make customizations to a more general IT policy on a per-user basis without having to define and keep track of a new customized IT policy for each user. Also, in some cases, the embodiments described herein can be adapted to customize any item of an IT policy on a per-user basis. Furthermore, the devices can be configured using this standardized IT policy for various types of networks and is not limited to those described herein. The various type of networks include Virtual Private Networks (VPN), Voice-over-IP (VoIP) networks, or networks that operate in accordance with various IEEE communication standards including WiFi standards such as the IEEE 802.11a, 802.11b, 802.11g standards (for wireless networks), IEEE 802.15 (for wireless personal area networks), IEEE 802.16 (for broadband wireless Metropolitan Area Networks), and other suitable IEEE network standards. Accordingly, the IT policy can be sent wirelessly to the mobile devices for wireless networks (this can also include Bluetooth and other close range wireless transmission techniques). Further, in some cases, the IT policy can also be sent to the mobile devices via a suitable wired connection such as a serial, USB or other appropriate wired connection for wired networks.

The standardized IT policy described here can also be extended to include per-group IT policy settings, where the precedence of dominance (in terms of decreasing dominance) is {user, group, enterprise}. Accordingly, an enterprise IT policy can be defined having universal IT policy rules (for the enterprise). Modifications can be made on a per-group basis by specifying settings for one or more global IT policy rules. Modifications can also be made on a per-user basis by specifying values for one or more per-user IT policy rules. The universal, global and per-user IT policy rules can then be merged prior to sending out the IT policy to the relevant users. The settings for global IT policy rules override the settings for any corresponding universal IT policy rules. Further, the settings for per-user IT policy rules override the settings for any corresponding global or universal IT policy rules. In addition, if users are assigned to more than one group, a priority order can be assigned to each group to aid in resolution of conflicting IT policy settings.

Embodiments are described herein for standardizing an IT policy that is used to configure one or more devices operating on a network. This standardized approach can be used to generate an IT policy that applies to a group of users as well as generating an IT policy that applies to a subset of users within the group for which different IT policy rules apply. The IT policy includes a set of global IT policy rules that are applicable to a group of users and may include a set of per-user IT policy rules that are applicable to one or more special users within the group. If per-user IT policy rules are defined for special users, then, generally, the user-specific IT policy rules are merged with the global IT policy rules to generate the IT policy that is sent to the special users.

Typically, when there is a per-user IT policy rule that is the same as, or otherwise conflicts with, a global IT policy rule, the value set for the per-user IT policy rule can override the value set for the same global IT policy rule. In at least some embodiments, the IT policy can be standardized by specifying a template of IT policy rules, which includes global and per-user IT policy rules. The per-user IT policy rules are settable on a per-user basis. Tables can also be defined which store data for global IT policies as well as for per-user IT policies that have been defined for one or more special users. Typically, the global IT policy includes global IT policy rules and the per-user IT policy includes per-user IT policy rules.

The global and per-user level IT policy rules can be merged to create IT policy data in response to various events such as: 1) at least one change is made to the global IT policy rules, 2) at least one change is made to the per-user IT policy rules, and 3) at least one change is made to both the global and per-user IT policy rules. The IT policy data can then be sent to the users that are affected by the change.

In one aspect, at least one embodiment described herein provides a method of providing IT policy data to configure devices associated with a group of users. The IT policy data is customizable on a per-user basis. The method comprises:

defining global IT policy rules with associated settings that are applicable to all users within the group of users;

defining user IT policy rules with associated settings that are applicable to a special user within the group of users;

generating IT policy data based on IT policy rules applicable to users within the group; and sending appropriate IT policy data to the corresponding users within the group.

The generating step may include:
generating global IT policy data based on settings for the global IT policy rules;
generating per-user IT policy data based on settings for the per-user IT policy rules; and
merging the global IT policy data and the per-user IT policy data to produce merged IT policy data.

During the merging step, the method may include overriding settings in the global IT policy data with settings in the per-user IT policy data for conflicting IT policy rules in the global and per-user IT policy data.

Both the global and per-user IT policy rules may comprise grouped IT policy rules with associated sub-IT policy rules, and during the merging step, the global and per-user IT policy data corresponding to sub-IT policy rules associated with one of the grouped IT policy rules are grouped together.

The method may include storing IT policy rules in an IT policy table, the IT policy rules including the global IT policy rules and the per-user IT policy rules, and the method may further include using a field in the IT policy table to indicate whether a given IT policy rule is settable on a per-user basis.

The method may include storing global IT policy data for a global IT policy, and storing per-user IT policy data for a per-user IT policy.

The sending step may include sending the global IT policy data to all of the users in the group that do not have any applicable per-user IT policy data.

If at least one of the global IT policy data and the per-user IT policy data is updated, the method includes sending the appropriate IT policy data to the corresponding users within the group.

The generating steps may include using tag-length-value encoding for generating IT policy data based on IT policy rules.

Typically, the sending step includes adding a header to the appropriate IT policy data to add security data, and to format the appropriate IT policy data for transmission to the devices.

The sending step includes sending the appropriate IT policy data to the devices via one of a wireless connection for a wireless network, and a wired connection for a wired network.

In another aspect, at least one embodiment described herein provides a computer program product comprising a computer readable medium embodying program code means executable by a processor for performing a method for providing IT policy data to configure devices associated with a group of users on a network, wherein the IT policy data is customizable on a per-user basis and the method comprises:
defining global IT policy rules with associated settings that are applicable to all users within the group of users;
defining user IT policy rules with associated settings that are applicable to a special user within the group of users;
generating IT policy data based on IT policy rules applicable to users within the group; and
sending appropriate IT policy data to the corresponding users within the group.

The method performed by the computer program product may further comprise:
generating global IT policy data based on settings for the global IT policy rules;
generating per-user IT policy data based on settings for the per-user IT policy rules; and
merging the global IT policy data and the per-user IT policy data to produce merged IT policy data.

In another aspect, at least one embodiment described herein provides an IT policy server for providing IT policy data to configure devices associated with a group of users on a network. The IT policy data is customizable on a per-user basis. The IT policy server comprises: a processor adapted to generate the IT policy data; a network interface connected to the processor, the network interface being adapted to allow the IT policy server to communicate with the network; and a memory unit connected to the processor, the memory unit being adapted to store applications and data related to the IT policy. The processor stores global IT policy rules with associated settings that are applicable to all users within the group of users; stores user IT policy rules with associated settings that are applicable to a special user within the group of users, generates the IT policy data based on IT policy rules applicable to users within the group, and sends appropriate IT policy data to the corresponding users within the group.

The processor can generate the IT policy data by generating global IT policy data based on settings for the global IT policy rules, generating per-user IT policy data based on settings for the per-user IT policy rules, and merging the global IT policy data and the per-user IT policy data to produce merged IT policy data.

During the merging step, the IT policy server can override settings in the global IT policy data with settings in the per-user IT policy data for conflicting IT policy rules in the global and per-user IT policy data.

Both the global and per-user IT policy rules comprise grouped IT policy rules with associated sub-IT policy rules, and during merging, the IT policy server can group together global and per-user IT policy data corresponding to sub-IT policy rules associated with one of the grouped IT policy rules.

The IT policy server can store IT policy rules in an IT policy table, the IT policy rules including the global IT policy rules and the per-user IT policy rules, and the IT policy table can include a field to indicate whether a given IT policy rule is settable on a per-user basis.

The IT policy server can store global IT policy data for a global IT policy, and per-user IT policy data for a per-user IT policy.

The IT policy server can send the global IT policy data to all of the users in the group that do not have any applicable per-user IT policy data.

The IT policy server can send the merged global IT policy data to the special user within the group.

The IT policy server can use tag-length-value encoding for generating IT policy data based on IT policy rules.

The IT policy server can add a header to the appropriate IT policy data to add security data, and to format the appropriate IT policy data for transmission to the devices.

It should be noted that the various modules described herein can be implemented in a variety of ways. In some cases, the modules can be implemented using C++ classes or another suitable software programming language. Furthermore, the functionality of some of the modules may be combined and provided by one module or by a server. For example, the data store 284 can also be provided by a server.

It should be understood that various modifications can be made to the embodiments described and illustrated herein, without departing from these embodiments, the scope of which is defined in the appended claims.

The invention claimed is:

1. A method of providing a policy to configure devices associated with a group of users, the policy being customizable on a per-user basis and constituting a set of rules that limit functionality of at least one application residing on the devices, the method comprising:
storing policy rules that are applicable to all users within the group of users;
responsive to detecting a change in the policy rules, determining whether there exists at least one user within the group of users for which per-user policy rules are stored, the per-user policy rules being applicable to the at least one user and set separately from the policy rules; and
in the event that the at least one user exists:
generating user policy data for the at least one user by merging the policy rules and the per-user policy rules;
determining whether a difference exists between the user policy data and stored last policy data that was previously sent to a device associated with the at least one user; and
in the event that the difference exists, sending the user policy data to the device for limiting the functionality of the at least one application.

2. The method of claim 1, further comprising
determining whether the difference exists by comparing the user policy data with the stored last policy data that was previously sent to the device.

3. The method of claim 1, further comprising saving settings for the policy rules in a first data structure and saving settings for per-user policy rules in a second data structure, the saving being performed before the generating.

4. The method of claim 1, further comprising assigning a priority order to multiple groups of users, the priority order facilitating resolution of conflicting settings for policy rules or per-user policy rules when the at least one user is assigned to more than one group of users.

5. The method of claim 1, further comprising sending a notification to the at least one application residing on the device associated with the at least one user that received the user policy data when the at least one application is affected by the user policy data.

6. The method of claim 1, further comprising after the sending:
authenticating the user policy data at the device; and
applying the user policy data to the device if the user policy data is authentic.

7. The method of claim 1, wherein the method further comprises receiving an acknowledgement from the device associated with the at least one user to confirm that the user policy data is received and applied.

8. The method of claim 7, wherein the method further comprises writing a status of the user policy data to a policy table in the data store when the acknowledgement is received.

9. A non-transitory computer readable medium embodying program code executable by a processor for providing a policy to configure devices associated with a group of users, the policy being customizable on a per-user basis and constituting a set of rules that limit functionality of at least one application residing on the devices, the code comprising instructions for:
storing policy rules that are applicable to all users within the group of users;
responsive to detecting a change in the policy rules, determining whether there exists at least one user within the group of users for which per-user policy rules are stored, the per-user policy rules being applicable to the at least one user and set separately from the policy rules; and
in the event that the at least one user exists:
generating user policy data for the at least one user by merging the policy rules and the per-user policy rules;
determining whether a difference exists between the user policy data and stored last policy data that was previously sent to a device associated with the at least one user; and
in the event that the difference exists, sending the user policy data to the device for limiting the functionality of the at least one application.

10. The non-transitory computer readable medium of claim 9, wherein the code further comprises instructions for determining whether the difference exists by comparing the user policy data with the stored last policy data that was previously sent to the device.

11. The non-transitory computer readable medium of claim 9, wherein the code further comprises instructions for saving settings for the policy rules in a first data structure and settings for per-user policy rules in a second data structure, the saving being done after the generating.

12. The non-transitory computer readable medium of claim 9, wherein the code further comprises instructions for assigning a priority order to multiple groups of users, the priority order facilitating resolution of conflicts for policy rules or per-user policy rules when the at least one user is assigned to more than one group of users.

13. A server for providing a policy to configure devices associated with a group of users, the policy being customizable on a per-user basis and constituting a set of rules that limit functionality of at least one application residing on the devices, the server comprising:
a processor adapted to generate policy data;
a network interface coupled to the processor and being adapted to allow the server to communicate with the network; and
a memory unit coupled to the processor, the memory unit being adapted to store applications and data related to the policy,
wherein, the processor is configured:
to store policy rules that are applicable to all users within the group of users;
responsive to detecting a change in the policy rules, to determine whether there exists at least one user within the group of users for which per-user policy rules are stored, the per-user policy rules being applicable to the at least one user and set separately from the policy rules; and
in the event that the at least one user exists:
to generate user policy data for the at least one user by merging the policy rules and the per-user policy rules;
to determine whether a difference exists between the user policy data and stored last policy data that was previously sent to a device associated with the at least one user; and
in the event that the difference exists, to send the user policy data to the device for limiting the functionality of the at least one application.

14. The server of claim 13, wherein the processor is configured to determine whether the difference exists by comparing the user policy data with the stored last policy data that was previously sent to the device.

15. The server of claim 13, wherein the processor is configured to save settings for the policy rules in a first data structure and settings for per-user policy rules in a second data structure, the saving being done after the generating.

16. The server of claim 13, wherein the processor is configured to assign a priority order to multiple groups of users, the priority order facilitating resolution of conflicting settings for policy rules or per-user policy rules when the at least one user is assigned to more than one group of users.

17. The server of claim 13, wherein the processor is configured to send a notification to the at least one application residing on the device associated with the at least one user that received the user policy data when the at least one application is affected by the user policy data.

18. The server of claim 13, wherein the server is configured to write a status of the user policy data to a policy table in the data store after receiving an acknowledgement from the device associated with the at least one user that the user policy data has been received and applied.

* * * * *